2,976,296

DERIVATIVES OF 1,4-DITHIA-ANTHRAQUINONE AND -HYDROQUINONE

Albert van Schoor, Traisa, near Darmstadt, and Ernst Jacobi, Siegmund Lust, and Horst Flemming, Darmstadt, Germany, assignors to E. Merck Aktiengesellchaft, Darmstadt, Germany, a corporation of Germany No Drawing. Filed Oct. 23, 1958, Ser. No. 769,067

Claims priority, application Germany Oct. 26, 1957

3 Claims. (Cl. 260—327)

The present invention relates to new fungicidal agents; and in particular is directed to fungicidal agents wherein the active ingredient is 2,3-dicyano-1,4-dithia-anthra-hydroquinone and/or the respective quinone thereof.

It has been found that 2,3-dicyano-1,4-dithia-anthra-hydroquinone of the Formula I:

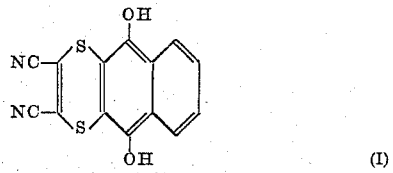

and the respective quinone of the Formula II:

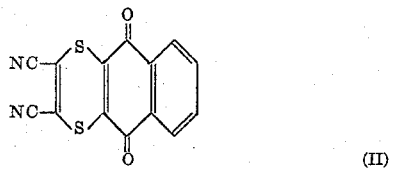

have excellent fungicidal properties.

The new compounds show a substantially higher fungicidal activity than the best fungicides now available in the market.

For purpose of testing the fungicidal activity, very different fungi were used, such as *Rhizoctonia solani, Venturia inaequalis* and *Alternaria Spec.* The fungicidal activity of the new compounds is on the average about twice as high as that of the best available commercial products, such as, TMTD (tetramethylthiuram-disulfide), Captan (N-trichloromethylthio-tetrahydrophthalimid), and Ziram (N,N-dimethylcarbamic acid zinc).

Accordingly, the subject matter of the invention resides in fungicidal agents which contain in addition to the customary fillers and carriers the 2,3-dicyano-1,4-dithia-anthra-hydroquinone of the above Formula I and/or the respective quinone of the above Formula II.

The invention further resides in the new compounds per se.

The new fungicides are well tolerated by plants. The 2,3-dicyano-1,4-dithia-anthra-hydroquinone was, for instance, prepared in the form of an 80 percent sprayable powder; and various vegetable plants, vines and ornamental plants were sprayed. None of the treated plants showed any phytotoxicity even when a quantity of 1 percent was used.

The 2,3-dicyano-1,4-dithia-anthra-hydroquinone can be prepared by reacting the sodium salt of 1,2-dicyano-1,2-dimercaptoethene with 2,3-dihalogen-1,4-naphthoquinone. Preferably 2,3-dichloro-1,4-naphthoquinone is used as the halogen compound. The reactions are preferably carried out in the presence of an inert solvent, such as methanol, ethanol, xylene or acetone. The reactions are also possible if one does not work in a solution but in suspensions. The 2,3-dicyano-1,4-dithia-anthra-hydroquinone can be produced, for instance, by catalytic hydrogenation of 2,3-dicyano-1,4-dithia-anthra-quinone.

Compounds which show a certain similarity in their constitution with the new fungicides are described in United States Patent No. 2,547,723, British Patent No. 747,909, and German Patent No. 876,018. Comparative tests have shown that these compounds show a considerably lower fungicidal activity than the fungicides according to the present invention.

The new compounds can be prepared in all forms of application, which are customarily used against pests. One can in accordance with known methods, for instance, prepare spraying solutions or dusting powder, or one can add the compounds to brushable paints or lacquers. By selecting a suitable solvent, textile fibers can also be saturated with the substances according to the invention. The compounds can also be produced in solutions or emulsions which can be sprayed by the aerosol method, using solvents known and customary for the purpose. Obviously, mixtures of the new fungicides can also be used, or the compounds according to the invention can be applied simultaneously with other known pesticides.

Generally, all preparations contain at most 95 percent by weight of the active ingredient.

The following are examples in accordance with the invention, wherein the symbol g. designates grams; and the temperatures are given in degrees centigrade.

EXAMPLE 1

3.7 g. of the disodium salt of 1,2-dimercapto-1,2-dicyano-ethene are mixed with 1.6 g. of 2,3-dichloro-naphthoquinone in alcoholic solution. The temperature of the reaction mixture rises to about 40°. The reaction is terminated by a subsequent boiling for ½ hour. Cooling to about 10° and sucking off produces the war product containing NaCl. The product is purified by washing out with water and recrystallizing from ethylal or acetone. The 2,3-dicyano-1,4-dithia-anthra-quinone crystallizes in the form of gray-brown needles with a violet metallic sheen, and melts at 220°.

EXAMPLE 2

3 g. of 2,3-dicyano-1,4-dithia-anthra-quinone are dissolved in 150 cc. of dioxane, and hydrogenated at room temperature with 2 g. of platinum-carbon (10 percent) as catalyst until 1 mole of hydrogen is absorbed. Subsequently, the product is filtered off from the catalyst, the filtrate is condensed and the residue is rubbed with petrol ether. Subsequently, the part remaining undissolved (2.9 g.) is recrystallized from acetone. The 2,3-dicyano-1,4-dithia-anthra-hydroquinone melts when rapidly heated at about 215°.

EXAMPLE 3

*Spray or dust powder*

80 parts of 2,3-dicyano-1,4-dithia-anthra-quinone,
10 parts of kaolin,
10 parts of sodium salt of the condensation product from oleic acid and methyltaurine (technical grade 32%), are ground to the required fineness. The powder thus produced can be sprayed in the form of diluted aqueous suspensions or nebulized.

EXAMPLE 4

*Emulsion concentrate*

40 parts of 2,3-dicyano-1,4-dithia-anthra-hydroquinone,
12 parts of polyoxyethylene-sorbital ester of a mixture of fatty and resin acids combined with a suitable sulfonate,
3 parts of sulfonated aliphatic polyesters, and 45 parts of xylene, are mixed with each other. The solution thus formed is emulsified in water and can be sprayed or nebulized.

EXAMPLE 5

Liquid aerosol 24 parts of 2,3-dicyano-1,4-dithia-anthra-quinone, or
 2,3-dicyano-1,4-dithia-anthra-hydroquinone,
76 parts of methylene chloride,
50 parts of difluordichloromethane,
25 parts of monofluortrichloromethane, and
25 parts of a technical propane-butane mixture, are filled into a liquid gas aerosol bomb and can be then nebulized therefrom.

EXAMPLE 6

Brushable agent 15 parts of 2,3-dicyano-1,4-dithia-anthra-quinone, or
 2,3-dicyano-1,4-dithia-anthra-hydroquinone,
10 parts of chalk,
8 parts of zinc oxide,
8 parts of ferric oxide,
5 parts of copper naphthenate,
8 parts of linseed oil stand oil, and
16 parts of maleic resin, are worked with 30 parts of a solvent into a brushable product. Preferably, a small part of the solvent, for instance, lacquer benzine, is initially rubbed into the substance mixture and subsequently the balance of the solvent, for instance, lacquer benzine with an addition of n-butanol, is added.

It will be understood that the foregoing description of the invention and the examples set forth are merely illustrative of the principles thereof. Accordingly, the appended claims are to be considered as defining the invention within the full spirit and scope thereof.

We claim:

1. Members of the group consisting of 2,3-dicyano-1,4-dithia-anthra-hydroquinone of the formula:

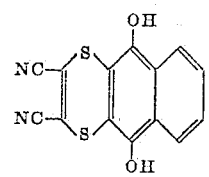

and the quinone of the formula:

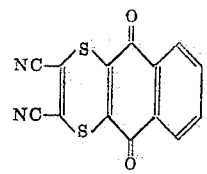

2. The 2,3-dicyano-1,4-dithia-anthra-hydroquinone.
3. The 2,3-dicyano-1,4-dithia-anthraquinone of the formula:

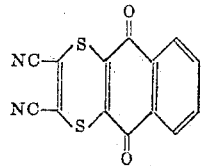

No references cited.